US012755466B2

(12) United States Patent
Saffre

(10) Patent No.: US 12,755,466 B2
(45) Date of Patent: Oct. 6, 2026

(54) METHOD FOR DISPLAYING A GRAPHICAL REPRESENTATION

(71) Applicant: RENAULT S.A.S., Boulogne Billancourt (FR)

(72) Inventor: Karl Saffre, Guyancourt (FR)

(73) Assignee: RENAULT S.A.S., Boulogne Billancourt (FR)

( * ) Notice: Subject to any disclaimer, the term of this patent is extended or adjusted under 35 U.S.C. 154(b) by 49 days.

(21) Appl. No.: 18/720,977

(22) PCT Filed: Nov. 16, 2022

(86) PCT No.: PCT/EP2022/082063
§ 371 (c)(1),
(2) Date: Jun. 17, 2024

(87) PCT Pub. No.: WO2023/117218
PCT Pub. Date: Jun. 29, 2023

(65) Prior Publication Data

US 2025/0061633 A1 Feb. 20, 2025

(30) Foreign Application Priority Data

Dec. 21, 2021 (FR) ....................................... 2114193

(51) Int. Cl.
*G06T 13/20* (2011.01)
*B60Q 1/44* (2006.01)
(Continued)

(52) U.S. Cl.
CPC .............. *G06T 13/20* (2013.01); *B60Q 1/444* (2013.01); *B60Q 1/5035* (2022.05); *B60Q 1/543* (2022.05);
(Continued)

(58) Field of Classification Search
CPC ... G06F 3/147; G09F 21/048; G09G 2380/06; G09G 2380/10; G06T 13/20;
(Continued)

(56) References Cited

U.S. PATENT DOCUMENTS 11,094,235 B2 8/2021 De Castro Turner et al.
2017/0240098 A1* 8/2017 Sweeney .............. B60Q 1/5035
(Continued)

OTHER PUBLICATIONS

International Search Report issued Feb. 10, 2023 in PCT/EP2022/082063 filed Nov. 16, 2022, 2 pages.
(Continued)

*Primary Examiner* — Jacinta M Crawford
(74) *Attorney, Agent, or Firm* — Oblon, McClelland, Maier & Neustadt, L.L.P.

(57) ABSTRACT

A method for displaying a graphical representation for an arrangement including a vehicle body, a device for displaying the graphical representation including a storage unit for storing digital data, at least one display being integrated into a front segment of the vehicle, and/or a rear segment of the vehicle, and a control unit for controlling the display, the display including a face intended for readout of the graphical representation and oriented toward the exterior. The method includes selecting, via the control unit, an animation script and image stored beforehand in the storage means, the image especially being a three-dimensional representation of an object, especially a logo.

20 Claims, 2 Drawing Sheets

(51) Int. Cl.
*B60Q 1/50* (2006.01)
*G06T 19/20* (2011.01)

(52) U.S. Cl.
CPC ...... *G06T 19/20* (2013.01); *G06T 2219/2016* (2013.01)

(58) Field of Classification Search
CPC . G06T 19/20; G06T 2219/2016; B60K 35/00; B60K 35/22; B60Q 1/444; B60Q 1/5035; B60Q 1/543
USPC .......................................................... 345/419
See application file for complete search history.

(56) References Cited

U.S. PATENT DOCUMENTS

| | | | | |
|---|---|---|---|---|
| 2018/0090011 A1* | 3/2018 | Morel | .................... | B60Q 1/545 |
| 2019/0310486 A1* | 10/2019 | Ferri | ...................... | G02B 30/25 |
| 2020/0156536 A1* | 5/2020 | Lee | ........................ | G06V 20/58 |

OTHER PUBLICATIONS

French Preliminary Search Report issued Jun. 21, 2022 in FR 2114193 filed Dec. 21, 2021, 3 pages (with English Translation of Category of Cited Documents).

* cited by examiner

METHOD FOR DISPLAYING A GRAPHICAL REPRESENTATION

TECHNICAL FIELD OF THE INVENTION

The invention generally concerns the field of devices for displaying a graphical representation, for example an image in relief, which may be animated, in particular using a holographic display means. The invention relates to a method for displaying a graphical representation. The invention also relates to a vehicle comprising the means for implementing the method.

Vehicles, whether passenger cars, utility vehicles or trucks, include a certain number of external parts which contribute to their identification by their brand. To further accentuate the belonging of a vehicle to a brand, it is known practice to use a logo, which may be applied to these parts of the vehicle, in particular external parts. For example, grilles, wheels, trunk lids or front compartment lids may include logos. Recently, on a more discreet level, headlamps as well as rear view mirrors have included distinctive brand inscriptions, for example through the presence of a logo. Thus, in addition to the general appearance conferred by the style line of the vehicle, certain parts contribute greatly to the esthetic characteristics of the vehicle, which has a considerable impact on the attractiveness of the vehicle for a user.

The advent of disruptive technologies is changing the approach to distinctive signs which signify belonging to a brand. In this regard, the esthetic and stylistic characteristics of the vehicle can be improved through the display of images on the exterior. Additionally, the ability to display images on an external part of a vehicle may be used to communicate information, potentially improving While it is well-established practice to associate a brand with a vehicle by virtue of its appearance in terms of style line, the complexity of design of future vehicles is forcing manufacturers to make increasing use of common components, including common bodies, such that the esthetic belonging of a vehicle to a brand is being eroded. In light of this trend, the association of a brand with its logo is now the only means of pointing a customer toward one brand or another, according to the nature and the quality of the services offered by the brand, independently of the esthetic and stylistic characteristics of the vehicle.

PRESENTATION OF THE INVENTION

The aim of the invention is to propose a method which overcomes the above drawbacks and improves vehicles known from the prior art.

More specifically, a subject of the invention is a method which is easy to implement, offering a high level of identification of a vehicle with a brand.

SUMMARY OF THE INVENTION

The invention relates to a method for displaying a graphical representation for an arrangement comprising a vehicle body, in particular a vehicle such as a motor vehicle, a device for displaying the graphical representation comprising a digital data storage means, a control unit for controlling the display means, at least one display means integrated in a front portion of the vehicle, in particular a front portion connecting the front lights, and/or a rear portion of the vehicle, in particular inside a rear light, the display means comprising a face intended to play the graphical representation and oriented toward the outside, the method being characterized in that it comprises a step according to which the control unit selects an image and an animation script previously recorded in said storage means, the image being in particular a three-dimensional representation of an object, in particular a logo.

The method is characterized in particular by the fact that the control unit modifies at least one animation parameter according to at least one parameter internal and/or external to the vehicle.

The method is characterized in particular by the fact that at least one parameter internal to the vehicle is a wake-up state of the vehicle, and/or an operating state of the vehicle, and/or a state of movement of the vehicle, and/or a state of braking of the vehicle.

The method may be characterized by the fact that it comprises a step of receiving the predetermined encrypted signal, followed by a step of bringing the vehicle into the wake-up state, followed by a step of selection of a graphical representation according to a first image and a first animation script by the control unit, followed by a step of sending to the display means a signal associated with this selected graphical representation.

The method may be characterized by the fact that the step of sending to the display means is carried out after the step of selection by the control unit of the display means integrated in the front portion of the vehicle.

The method is characterized by the fact that it comprises a step of identifying an operating state of the vehicle via said identification means, followed by a step of selection of a graphical representation according to a second image and a second animation script by the control unit, followed by a step of sending to the display means a signal associated with this selected graphical representation.

The method may be characterized by the fact that the step of sending to the display mean is carried out after the step of selection by the control unit of the display means integrated in the front and rear portions of the vehicle.

The method is characterized by the fact that it comprises a step of identifying a start-up state of the powertrain of the vehicle, followed by a step of selection of a graphical representation according to a second image and a second animation script by the control unit, followed by a step of sending to the display means a signal associated with this selected graphical representation.

The method may be characterized by the fact that the step of sending to the display mean is carried out after the step of selection by the control unit of the display means integrated in the front portion and/or the rear portion of the vehicle.

The method is characterized by the fact that it comprises a step of receiving a signal representative of the braking intensity, followed by a step of selection of a graphical representation according to a third image and a third animation script by the control unit, followed by a step of sending to the display means a signal associated with this selected graphical representation.

The method may be characterized by the fact that the step of sending to the display mean is carried out after the step of selection by the control unit of the display means integrated in the rear portion of the vehicle.

The method may be characterized by the fact that the first, second and third images differ only by their respective size, in particular the first image is of smaller dimension than the second image, and/or the second image is of smaller dimension than the third image.

The method may be characterized by the fact that the first and second scripts differ by the speed of animation of the image, in particular the first script makes it possible to animate the image at a speed of rotation lower than that of the second script, and/or the second script makes it possible to animate the image at a speed of rotation lower than that of the third script.

The method is characterized by the fact that at least one of the scripts defines a speed of rotation of the image about an axis, in particular about an axis vertical to the vehicle.

The method is characterized by the fact that it comprises a step of transferring the operating parameters of at least one display means according to the light intensity signal transmitted from said brightness measuring means to the control unit.

The invention also relates to a vehicle, in particular a motor vehicle, characterized in that it comprises hardware and/or software means for implementing the abovementioned method.

PRESENTATION OF THE FIGURES

These subjects, features and advantages of the present invention will be set out in detail in the following description of a particular embodiment provided on a non-limiting basis in relation to the attached figures, in which.

DETAILED DESCRIPTION

Figure 1:
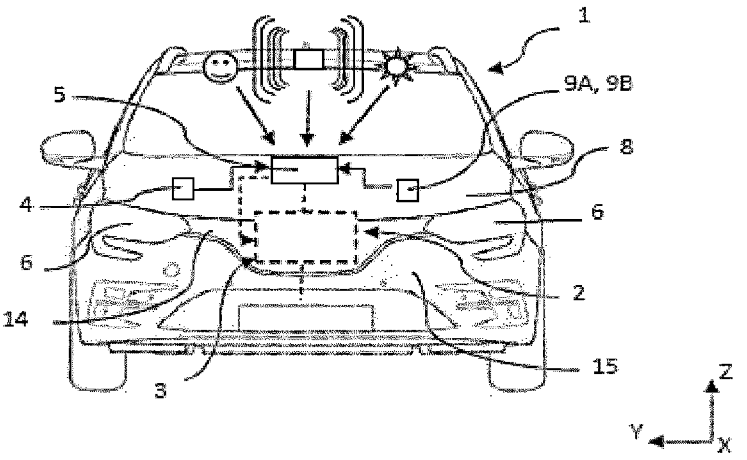
FIG. 1 shows the vehicle in front view, in which the display device is in sleep mode, according to an embodiment of the invention.

FIG. 1 schematically shows a front face of a motor vehicle according to an embodiment of the invention. The vehicle 1 comprises an openable element 8, such as the cover for closing off a front compartment in which a means of propulsion of the vehicle may be placed, in particular an electric powertrain. The front face has right and left front lights 6 which are partially surrounded by a front bumper 15. The end edges of the front hood 8, of the front lights 6 and of the bumper delimit a central area provided with a grille 14. The grille 14 may be perforated or solid. The grille 14 may be made directly as one with the bumper 15 so as to form a single component made in one piece.

Note that, in the figures and in the description, the axis X designates the longitudinal axis of the vehicle. When moving forward and in a straight line, the vehicle progresses from rear to front in a direction parallel to its longitudinal axis. The axis X is oriented from the front to the rear of the vehicle, that is to say in the direction of reverse. The axis Y designates the transverse axis of the vehicle. The axis Y is oriented from left to right, with left and right being defined from the perspective of a vehicle driver. The axis Z designates the axis perpendicular to the axis X and to the axis Y. The vehicle is considered to rest on horizontal ground. The axis Z is a vertical axis, oriented from bottom to top. The axes X, Y and Z form an orthogonal coordinate system.

Figure 2:
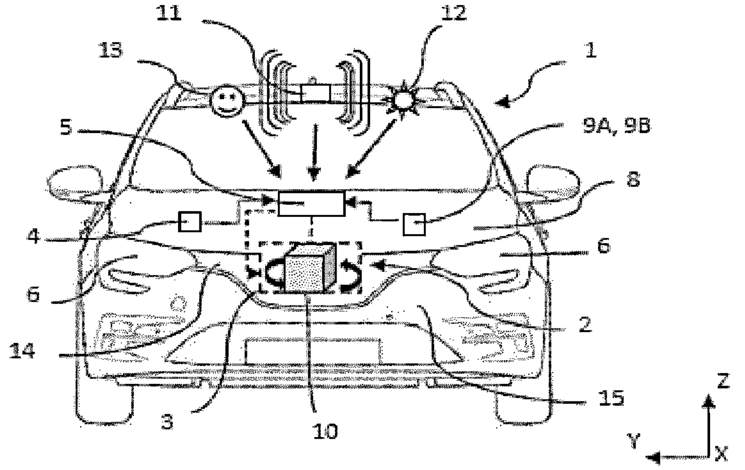
FIG. 2 shows the vehicle of FIG. 1 in which a display method is implemented to adapt the display to the operating or start-up mode of the vehicle, according to the invention.

In FIG. 1 and FIG. 2, the vehicle 1 is shown from the front which includes a display device 2 for displaying a graphical representation. Preferably, such a device comprises a means for showing an image, which is referred to below as the display means 3. In this case, the display means includes a substantially flat face which is made visible from outside the vehicle.

Figure 3:
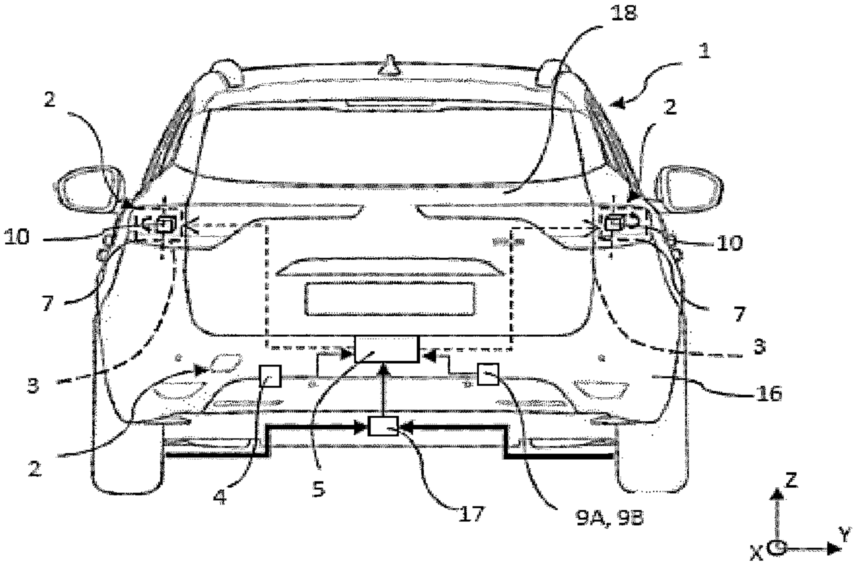
FIG. 3 is a rear view of a vehicle, in which a display method is implemented to adapt the display to the operating or start-up mode of the vehicle, according to the invention.
Figure 4:
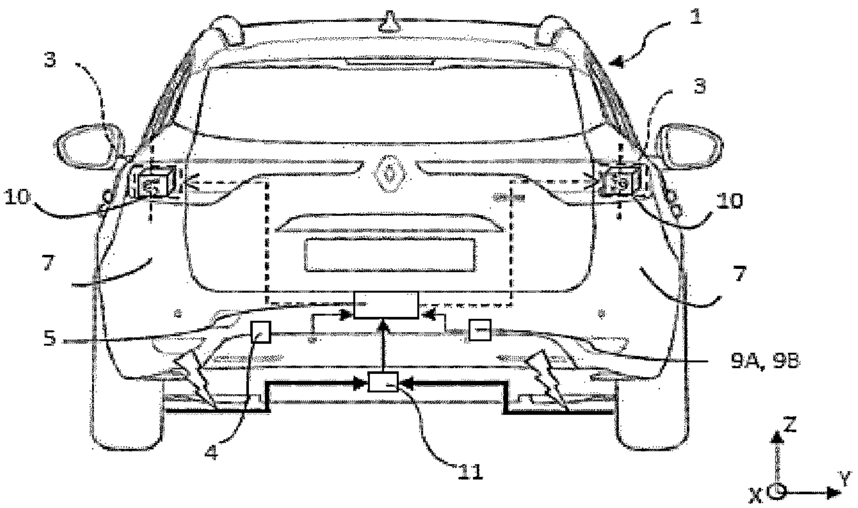
FIG. 4 is a rear view of the vehicle of FIG. 3, in which a display method is implemented to adapt the display to the braking mode of the vehicle, according to the invention.

In FIG. 3 and FIG. 4, the vehicle 1 is shown from the rear which includes a display device 2 for displaying a graphical representation. Preferably, such a device comprises two means for showing an image, such as a display means 3 with a substantially flat face which is made visible from outside the vehicle. Preferably, the display means are arranged at the location on the body intended to receive the rear lights. According to a preferred embodiment, a rear light 7 integrates a display means 3. FIG. 3 and FIG. 4 depict a vehicle from the rear in which the rear lights 7 each include a display means 3. For example, the rear portion of the vehicle 1 comprises an openable element 18, in this case of tailgate type, which is movable on the body of the vehicle, in particular at the roof. The openable element 18 is partially surrounded by an impact protection element, a rear bumper 16 which extends along its lower and lateral part. The rear lights 7 partially surround the openable element 18, and are located above the rear bumper 16. The rear lights may moreover also extend transversely to the vehicle, directly on the tailgate, as shown.

In FIG. 1 and FIG. 2, the display means 3 is integrated into the front portion such that it is attached directly to the front portion of the vehicle. The display means 3 is in particular mounted in such a way as to be flush with the grille 14 such that it extends in a plane of axis YZ which is identical to that of the grille 14. For example, the grille includes an opening in which the display means is housed.

The display device 2 further comprises a digital data storage means 4 in which images and animation scripts have been previously downloaded. The image to be displayed may be a 2D representation, preferably a logo. The image to be displayed may be a 3D representation, for example a logo depicted in relief.

Several animation scripts have been recorded previously in said storage means 4 such that each of the scripts is associated with at least one parameter internal and/or external to the vehicle. The control unit 5 is advantageously adapted to select an image and a script from several choices offered as a result of the various recordings previously made by downloading data to said storage means 4.

The control unit 5 is adapted to make a selection according to at least one internal parameter of the vehicle. For example, the control unit takes into consideration, as internal parameter, the following states: a wake-up state (W) of the vehicle, an operating state (F) of the vehicle, a state of braking (B) of the vehicle, and a state of movement (D) of the vehicle.

Thus, in each of the abovementioned states, the control unit 5 is programmed to select a pair made up of an image and an animation script.

In addition, other parameters may influence the image to be displayed, such as for example the brightness, whether internal or external, in order to ensure that the image to be displayed can be read in all situations. For example, in the event of strong external brightness, the parameters of the display means are modified in order to adapt the display intensity to the external brightness.

This is why, in FIG. 1 and FIG. 2, a brightness measuring means 12 is linked to the control unit 5. Such a measuring means is intended to emit a signal representative of the ambient light intensity.

Depending on the value of the light intensity measured by the brightness measuring means 12, the control unit 5 is programmed to influence the operating parameters of the display means 3. Such a brightness measuring means 12 may be a sensor located inside the vehicle. Preferably, it is a sensor located outside the vehicle such that the latter delivers to the control means 5 a signal intended to influence the parameters of the display means directly according to the light intensity measured outside the vehicle.

Other elements external to the vehicle 1 are also taken into consideration, such as the presence of pedestrians near the vehicle. It is in this regard that in FIG. 1 and FIG. 2, a pedestrian detection means 13 is shown in connection with the control unit 5. Such a detection means is intended to emit a signal when at least one pedestrian is identified near the front of the vehicle.

When said means for detecting at least one pedestrian 13 emits a signal, the control unit 5 is then adapted to select an image and an animation script, as well as at least one operating parameter of the display means 3, as will be described in detail below.

The control unit 5 is in this case at the core of the display device 2 because it is designed to take into account the environment in which the vehicle is operating so as to influence, and modify if necessary, the nature of the graphical representation which it has previously selected.

The control unit 5 is a computer program medium, in particular a computer, capable of receiving computer program codes intended to be read for the purposes of implementing the method of the invention.

According to the invention, the method implementing the arrangement comprises a body of a vehicle 1 and a display device 2 may include the case of a wake-up situation W which is initiated when the means for detecting a signal 8 on board the vehicle receives a predefined encrypted signal. Such a signal may be emitted by an electronic key contained on a mobile medium such as an electronic badge or a telephone. Alternatively, the signal may be transmitted by an antenna of a telephone network. Only such a means for detecting a signal is kept on standby when the vehicle is locked, in other words when it is in a sleep state. By virtue of the link between said signal detection means 8 and the control unit 5, upon receipt by the detection means of a signal containing an encrypted authentication key associated with the vehicle, the latter then switches to the wake-up state. The display device 2 also comes out of a sleep phase. The control unit 5 then selects a graphical representation 10 according to a first image and a first animation script. Following this selection, a signal associated with this selected graphical representation is then sent to the display means 3.

In the hypothesis of an arrangement comprising a body of a vehicle 1 and a display device 2 comprising several display means 3, the control unit 5 may use each of the display means.

According to a variant, the control unit 5 is adapted to select the display means located in direct proximity to the user. For example, if the user is detected either in the front part or in the rear part of the vehicle by the pedestrian detection means 13, the selected display means is located in a front portion and a rear portion of the vehicle, respectively.

Whatever the position of the display means 3 on the vehicle, the first image and the first animation script are transposed by the control unit 5 into a signal intended for the display means containing the data relating to the selected image and script. This signal may also include the parameters of the display means.

For example, in the wake-up state "W" of the vehicle, the image depicted on the display means 3 is a logo, which may be associated with the brand of the vehicle, depicted in the fixed state, it that is to say without movement. In the wake-up state W, the light intensity of the display means may be continuously variable for example according to modulations of intensity following a succession of cadenced increase and reduction cycles.

The method for implementing the arrangement may also include a step of identifying an operating state "F" of the vehicle, characteristic of a situation of imminent movement arising from the selection of a mode in which the various components of the powertrain of the vehicle are switched on by the user.

For this purpose, the arrangement comprises an identification means 9A for identifying an operating state of the vehicle, in particular by means of a signal emitted by an engine computer and/or an electric or electronic selector, which is linked to the control unit 5. The identification means 9A is adapted to receive a signal issued by a physical actuation means, such as a start button. According to a variant embodiment, the identification means 9A is adapted to receive a signal emitted by a computer of a voice control device interpreting the intention of use of the vehicle as transmitted by voice.

By virtue of the link between said identification means 9A and the control unit 5, the latter then selects a graphical representation 10 according to a first image and a first animation script. Following this selection, a signal associated with this selected graphical representation is then sent to the display means 3.

In the hypothesis of an arrangement comprising a body of a vehicle and a display device comprising several display means, the control unit 5 may use each of the display means. The control unit 5 is thus adapted to send simultaneously to the display means 3 arranged respectively in the left and right rear lights, a signal according to which the color of the image to be displayed is predetermined, preferably a color spectrum oriented red.

The display means 3 receives a control signal corresponding to the second image and to a second animation script transposed by the control unit 5.

For example, in the operating state of the vehicle, the image depicted on the display means 3 is identical in geometry to that of the first image, that is to say the logo, but this time with an animation script giving the logo an animation whereby it rotates on itself about a vertical axis substantially of orientation Z according to a first predetermined speed. In the operating state "F" of the vehicle, the control unit 5 fixes the display intensity at a constant value. It nevertheless takes into account the ambient light intensity to define this constant display intensity value.

The method for implementing the arrangement may also include a step of identifying a state of movement "D" of the vehicle, characteristic of a selection of a vehicle powertrain operating mode, which may be associated in particular with manual selection by the user.

Said identification means 9B for identifying the powertrain start-up mode may receive a signal emitted by an engine computer and/or an electric or electronic selector, which is linked to the control unit 5. The identification means 9B is for example adapted to receive a signal issued by a physical actuation means, such as a gear selector positioned in Drive mode, corresponding to putting the vehicle into drive, forward in the direction X.

According to a variant embodiment, the identification means 9B is adapted to receive a signal emitted by a computer of a voice control device interpreting the intention of use of the vehicle as transmitted by voice.

By virtue of the link between said identification means 9B and the control unit 5, the latter then selects a graphical representation 10 according to the second image and the second animation script. For example, the second animation script gives the logo an animation whereby it rotates on itself about a vertical axis substantially of orientation Z according to a second predetermined speed, which is greater than the first speed mentioned above. Following this selection, a signal associated with this selected graphical representation is then sent.

In the hypothesis of an arrangement comprising a body of a vehicle and a display device comprising several display means, the control unit 5 may then use each of the display means. The image is then displayed simultaneously on the front display means and on the rear display means.

For example, in the state of movement "D" of the vehicle, the image depicted on the display means 3 is identical in geometry to that of the first image, that is to say the logo, but this time with an animation script giving the logo an animation whereby it rotates on itself about a vertical axis substantially of orientation Z according to the second predetermined speed.

In the state of movement "D" of the vehicle, the control unit 5 fixes the display intensity at a constant value. It nevertheless takes into account the ambient light intensity to define this constant display intensity value.

According to a variant embodiment, the speed of rotation of the logo is variable, in particular in a manner substantially proportional to the speed of movement of the vehicle. When the vehicle stops in the state of movement "D", the speed of rotation of the logo displayed is lower than the predetermined maximum speed of rotation, it then corresponds to the first speed mentioned above.

The method for implementing the arrangement may include the case of a braking situation, which will now be described.

In the event of braking "F", the arrangement comprises a braking intensity calculation means 17 which is linked to the control unit 5.

In the state of braking "F" of the vehicle, the control unit 5 selects a third image in the storage unit 4. The selected image is displayed with a rotational movement through the rear lights, as shown in FIG. 4. The control unit 5 thus simultaneously sends to the display means 3 arranged respectively in the left and right rear lights, a signal according to which the color of the image to be displayed is predetermined, preferably a color spectrum oriented toward red. The braking intensity calculation means 17 does not emit any signal since no information relating to the braking pressure is transmitted to it by a braking device. The vehicle is in the operating state such that the display means 3 are showing the second image animated according to the second script, thus giving a dynamic character to the graphical representation displayed by the rear lights including the display means.

In the case of display means arranged at the rear and at the front, apart from a difference in the color of the image to be displayed, each one shows the same image with the same animation script. By virtue of the arrangement according to the invention, the braking device may be linked to a motor, in particular an electric motor, providing a braking torque intensity value. It may also be linked to a friction braking device acting directly on the wheels of the vehicle or the wheel drive shaft.

In a vehicle braking situation, said braking intensity calculation means 17 transmits to the control unit 5 a signal representative of the braking intensity. According to this received value, the control unit 5 selects in the storage means 4 a third image and a third animation script. Once the selection has been made, the control unit transmits to the display means 3 arranged a signal representative of the third image animated by the third script.

For example, the third image depicts the logo with an increased size, as can be seen in FIG. 4. The parameter of the rear display means 3 may also be modified, for example as regards the display intensity of the display means, which is thus increased in accordance with the variation in braking intensity. The third script may correspond to a zero rotation speed, with the aim of freezing the logo in a static state. Such a situation helps ensure the safety of the vehicle and its occupants by alerting the vehicles behind them to the nature of the braking, taking into account the braking force of the vehicle. The control unit 5 maintains its last selection until the vehicle is returned to an operating state by pressing the accelerator pedal for example.

In the case of an arrangement comprising both at least one display means positioned in a front portion of the vehicle and at least one display means positioned in a rear portion of the vehicle, transmission of the signal by the control unit 5 of the vehicle, taking into account the braking intensity of the vehicle, is carried out after the step of selection by the control unit 5, toward only at least one display means 3 integrated only in the rear portion of the vehicle, preferably toward the display means arranged inside each of the rear lights of the vehicle, as shown in FIG. 4.

The invention claimed is:

1. A method for displaying a graphical representation for an arrangement comprising a vehicle body, a device for displaying the graphical representation comprising a digital data storage, at least one display integrated in a front portion of a vehicle and/or a rear portion of the vehicle, and processing circuitry, the display comprising a face configured to play the graphical representation and oriented toward outside of the vehicle, the method comprising:

- selecting, via the processing circuitry, an image and an animation script previously recorded in said digital data storage, the selecting including;
  - receiving a predetermined encrypted signal, when the vehicle is in a sleep state, in which the vehicle is locked;
  - after the receiving, bringing the vehicle from the sleep state, in which the vehicle is locked, into a wake-up state;
  - after the bringing, selecting a graphical representation according to a first image and a first animation script by the processing circuitry; and
  - after the selecting the graphical representation, sending to the display a signal associated with the selected graphical representation.

2. The method as claimed in claim 1, wherein the vehicle body is a body of a motor vehicle.

3. The method as claimed in claim 1, wherein the display is integrated into the front portion and the front portion connects front lights of the vehicle.

4. The method as claimed in claim 1, wherein the display is integrated into the rear portion inside a rear light of the vehicle.

5. The method as claimed in claim 1, wherein the image is a three-dimensional representation of an object.

6. The method as claimed in claim 1, wherein the image is a logo.

7. The method as claimed in claim 1, wherein the processing circuitry is configured to modify at least one animation parameter according to at least one parameter internal and external to the vehicle.

8. The method as claimed in claim 7, wherein the at least one parameter internal to the vehicle is a wake-up state of the vehicle, an operating state of the vehicle, a state of movement of the vehicle, or a state of braking of the vehicle.

9. The method as claimed in claim 7, wherein the at least one parameter internal to the vehicle is an operating state of the vehicle and a state of movement of the vehicle.

10. The method as claimed in claim 7, wherein the at least one parameter internal to the vehicle is a wake-up state of the vehicle, an operating state of the vehicle, a state of movement of the vehicle, and a state of braking of the vehicle.

11. The method as claimed in claim 1, further comprising identifying an operating state of the vehicle via the processing circuitry followed by selecting a second graphical representation according to a second image and a second animation script by the processing circuitry, followed by sending to the display a signal associated with the second selected graphical representation.

12. The method as claimed in claim 1, further comprising identifying a start-up state of a powertrain of the vehicle, followed by selecting a second graphical representation according to a second image and a second animation script by the processing circuitry, followed by sending to the display a signal associated with the second selected graphical representation.

13. The method as claimed in claim 1, further comprising receiving a signal representative of a braking intensity, followed by selecting a third graphical representation according to a third image and a third animation script by the processing circuitry, followed by sending to the display a signal associated with the third selected graphical representation.

14. The method as claimed in claim 13, wherein at least one of the first and third animation scripts defines a speed of rotation of the image about an axis.

15. The method as claimed in claim 14, wherein the axis is an axis vertical to the vehicle.

16. The method as claimed in claim 1, further comprising transferring operating parameters of the at least one display according to a light intensity signal transmitted from a brightness measuring sensor to the processing circuitry.

17. A device for displaying a graphical representation, the device comprising:
- at least one display integrated in a front portion of a vehicle and/or a rear portion of the vehicle, the display comprising a face configured to play the graphical representation and oriented toward outside of the vehicle; and
- processing circuitry configured to select an image and an animation script previously recorded in a digital data storage, the selecting including:
  - receiving a predetermined encrypted signal, when the vehicle is in a sleep state, in which the vehicle is locked,
  - after the receiving, bringing the vehicle from the sleep state, in which the vehicle is locked, into a wake-up state,
  - after the bringing, selecting a graphical representation according to a first image and a first animation script by the processing circuitry, and
  - after the selecting the graphical representation, sending to the display a signal associated with the selected graphical representation.

18. A vehicle, comprising:
the device as claimed in claim 17.

19. The device as claimed in claim 17, wherein the processing circuitry is further configured to:
- identify an operating state of the vehicle,
- followed by, select a second graphical representation according to a second image and a second animation script, and
- followed by, send to the display a signal associated with the second selected graphical representation.

20. A non-transitory computer-readable storage medium including computer executable instructions, wherein the instructions, when executed by a computer, cause the computer to perform a method for displaying a graphical representation for an arrangement comprising a vehicle body, a device for displaying the graphical representation comprising a digital data storage, at least one display integrated in a front portion of a vehicle and/or a rear portion of the vehicle, and processing circuitry, the display comprising a face configured to play the graphical representation and oriented toward outside of the vehicle, the method comprising:
- selecting, via the processing circuitry, an image and an animation script previously recorded in said digital data storage, the selecting including:
  - receiving a predetermined encrypted signal, when the vehicle is in a sleep state, in which the vehicle is locked;
  - after the receiving, bringing the vehicle from the sleep state, in which the vehicle is locked, into a wake-up state;
  - after the bringing, selecting a graphical representation according to a first image and a first animation script by the processing circuitry; and
  - after the selecting the graphical representation, sending to the display a signal associated with the selected graphical representation.

* * * * *